(12) United States Patent
McDonald

(10) Patent No.: US 11,601,368 B2
(45) Date of Patent: Mar. 7, 2023

(54) PREDICTIVE CONGESTION DETECTION

(71) Applicant: Hewlett Packard Enterprise Development LP, Houston, TX (US)

(72) Inventor: Nicholas George McDonald, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 168 days.

(21) Appl. No.: 16/358,489

(22) Filed: Mar. 19, 2019

(65) Prior Publication Data

US 2020/0304412 A1  Sep. 24, 2020

(51) Int. Cl.
*H04L 47/127* (2022.01)
*H04L 45/00* (2022.01)
*H04L 45/12* (2022.01)

(52) U.S. Cl.
CPC .......... *H04L 47/127* (2013.01); *H04L 45/123* (2013.01); *H04L 45/38* (2013.01); *H04L 45/70* (2013.01)

(58) Field of Classification Search
CPC ................................ H04L 47/10; H04L 49/25
See application file for complete search history.

(56) References Cited

U.S. PATENT DOCUMENTS

| 8,004,990 | B1 * | 8/2011 | Callon .................... H04L 47/10 370/230.1 |
| 9,559,975 | B1 * | 1/2017 | Chen .................. H04L 47/6215 |
| 9,860,185 | B2 | 1/2018 | Morandin | |
| 2005/0108444 | A1 | 5/2005 | Flauaus et al. | |

FOREIGN PATENT DOCUMENTS

CN  1545286 A  11/2004

OTHER PUBLICATIONS

En-Jui Chang et al., "Path-congestion-aware Adaptive Routing with a Contention Prediction Scheme for Network-on-chip Systems," Jan. 2014, pp. 113-126, IEEE.
Nikhil Jain, "Optimization of Communication Intensive Applications on HPC Networks," 2016, pp. 1-179, University of Illinois at Urbana-Champaign, Urbana, Illinois, USA.
Sheng Xu et al., "Congestion-aware Adaptive Routing with Quantitative Congestion Information," Dec. 2016, pp. 216-223, IEEE.
Umit Y. Ogras and Radu Marculescu, "Prediction-based Flow Control for Network-on-chip Traffic," Jul. 2006, pp. 839-944, Carnegie Mellon University, Pittsburgh, PA, USA.

* cited by examiner

*Primary Examiner* — Ayaz R Sheikh
*Assistant Examiner* — Debebe A Asefa
(74) *Attorney, Agent, or Firm* — Sheppard Mullin Richter & Hampton LLP

(57) ABSTRACT

A system and method for predictive congestion detection for network devices is provided. A routing engine associated with an input of a router receives congestion information from an output, utilizing the received congestion information to initialize a congestion value associated with that output. Between receipt of updated congestion information from the output, the routing engine predicts a potential change in the congestion state at the output based on the congestion value and information regarding usage of the output that is known to the routing engine.

20 Claims, 7 Drawing Sheets

PREDICTIVE CONGESTION DETECTION

BACKGROUND

Adaptive or dynamic routing is a process where a router can forward data via a different route or to a given destination based on the current conditions of the communication circuits within a network. Networks are capable of routing around issues within the network, such as another network device in the network going down, failure of a communication link, and congestion. Routers (or network switches) enabled with adaptive routing can determine the optimal route for each data packet and decide, on-the-fly, the "next hop" or next network device in the network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
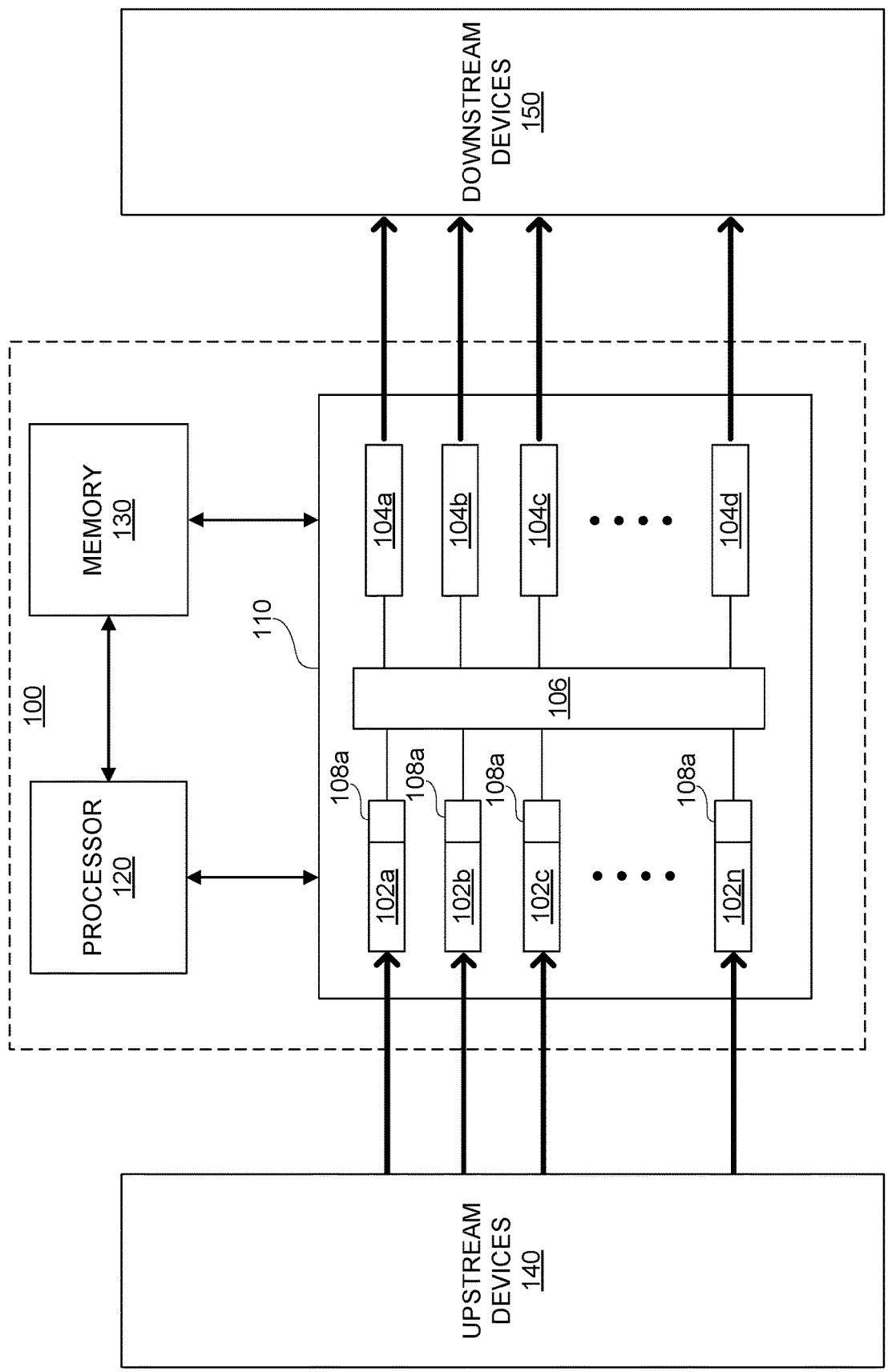
FIG. 1 is an example router in accordance with embodiments of the technology disclosed herein

The figures are not exhaustive and do not limit the present disclosure to the precise form disclosed.

DETAILED DESCRIPTION

Routers or other network devices within a communications network that support adaptive routing utilize congestion detection to determine the optimal route for each data packet it receives from an upstream device. Many different approaches are used to detect congestion within the network, such as by measuring packet loss through the use of acknowledgment messages (ACKs), setting a threshold of buffer utilization, and measuring channel load, among others. In many network topologies, adaptive routing may identify more than one acceptable route on/through which a data packet may be routed to maintain network performance and/or client requirements (e.g., service level agreements (SLAB)). For larger networks, taking a longer path through the network (i.e., making more hops) may be optimal compared to a shorter route due to congestion on the shortest path.

These routing decisions are made by one or more routing engines. In some cases, a routing engine may be at each of the router's inputs, the routing engine being dedicated to making the routing decisions for the respective input, or each routing engine may control decision making for one or more inputs. Some other systems may implement a global routing engine, making decisions for all inputs. Moreover, these routing decisions may be performed for each packet received. Each output broadcasts congestion information about itself and/or its associated link and downstream data buffer to the input routing engine(s). Each routing engine receives this congestion information from every output, using this value in determining which of the acceptable routes is optimal at that particular time.

However, because the congestion information is not instantaneously received by the inputs, the information about congestion at the outputs used by the routing engine(s) of the inputs to make the adaptive routing decision is commonly stale. The staleness of the information depends on the frequency of broadcast and the latency with which the information travels from the outputs to the inputs within the router. In high radix routers, this delay can be large, for example, modern router architectures (e.g., fully-buffered crossbar, hierarchical crossbar, network-within-a-network, etc.) may have congestion feedback delays of up to 100 ns. As the congestion feedback latency increases, the achievable throughput of the network may become drastically reduced due to adaptively routing with stale network state information. Simulations have shown that achievable throughput on a fat-tree network may be reduced to only 20% of its ideal throughput. There have been some attempts to overcome this issue a caused by stale congestion state information. One approach is to simply minimize the number of outputs to which an input may route traffic. By limiting the options for the inputs, the mean latency can be reduced due to each input not requiring congestion value information from all of the outputs, reducing the delay between receipt of updated congestion information. However, the information being used is still stale and routing flexibility is limited within the network. Moreover, this example and other known solutions are output-focus. That is, such solutions focus on trying to minimize the latency from the output side—attempting to reduce the amount of information that an input needs to receive from the outputs.

In contrast to the known solutions described above, embodiments of the present disclosure provide an input-focused approach to minimizing the impact of stale congestion state values. Upon receipt of a congestion value from an output, the routing engine of an input will treat that value as true, making a routing decision based on that information. Thereafter, the routing engine will make predictions regarding the congestion state at the output by considering usage data know to the routing engine until another congestion state value is received from the output. Currently, routing engines make routing decisions based on the received congestion information, regardless of the age of the information. However, embodiments of the technology disclosed herein utilize usage information known to the routing engine(s) to make predictions about how the congestion situation at the outputs may have changed prior to receiving new information from the outputs. The routing engine(s) track the amount of traffic sent (or not sent) to each output. Based on this information, the routing engine(s) can make a prediction whether to alter the congestion information previously received from the output, enabling the routing engine(s) to account for known input-side usage data that is not considered within the stale congestion information. In this way, the adaptive routing algorithm will result in a better choice of the various acceptable solutions. This fast acting adaptive routing facilitates high throughput and low latency, increasing the overall performance of the network.

FIG. 1 illustrates an example router 100 in accordance with embodiments of the present disclosure. A router is a device composed of inputs and outputs of a specific type, including but not limited to ports, buffers, queues, physical channels, virtual channels, among others. Example router 100 is intended to illustrate aspects of the technology disclosed herein and should not be interpreted as limiting the scope of the technology solely to the example router 100. A person of ordinary skill would understand that the technology is applicable in any routing environment employing adaptive routing. Moreover, FIG. 1 shows the elements of router 100 necessary for explaining embodiments of the technology disclosed herein. In some embodiments, router 100 may comprise some, but not all, of the components illustrated in FIG. 1. Moreover, although not pictured, router 100 may include additional components for performing other tasks or are necessary for the basic operation of router 100. A person having ordinary skill would understand that those components would be present in router 100.

Referring to FIG. 1, router 100 may include a main processor 120, a memory 130, and a switching component 110. Router 100 is connected to one or more upstream devices 140 and one or more downstream devices 150 within a network. In various embodiments, router 100 may be included within a variety of network architectures, including but not limited to a fat tree architecture, mesh topology, hypercube architectures, or star architectures, among others. The identified architectures are provided for illustration only and should not be interpreted to limit the scope of the present disclosure.

In various embodiments, main processor 120 may comprise one or more microprocessors. In various embodiments, main processor 120 may execute non-transitory machine-readable instructions to perform various functions of router 100. Main processor 120 may be communicatively coupled to memory 130 and switching component 110. Memory 130 may comprise non-transitory media, such as non-volatile media and/or volatile media. Non-volatile media includes, but is not limited to, optical or magnetic disks. Volatile media includes, but is not limited to, dynamic memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Switching component 110 comprises a plurality of inputs 102$a$-$n$ and a plurality of outputs 104$a$-$n$. In various embodiments, switching component 100 may include upwards of thousands of inputs 102$a$-$n$ and outputs 104$a$-$n$. As illustrated by the thick black arrows, data traffic enters each of the inputs 102$a$-$n$ and egresses from the router through the outputs 104$a$-$n$. Data traffic may comprise blocks of data of various types, including but not limited to, packets, messages, frames, flows, and/or cells, among others. Switching fabric 106 connects each of the plurality of inputs 102$a$-$n$ with each of the plurality of outputs 104$a$-$n$ such that any input 102$a$-$n$ may send data traffic to any output 104$a$-$n$ depending on the selected route. In various embodiments, switching fabric 106 may be a crossbar (Xbar) switch, a crossover switch, shared memory, broadcast bus, or any other internal switching architecture used in routers and other network forwarding devices. In various embodiments, switching component 110 may be implemented using customized hard-wired logic, a plurality of electrical traces and/or wires, one or more application specific integrated circuits (ASICs) or field programmable gate arrays (FP-GAs), firmware and/or program logic. Some routers 100 may include one or more switching components 110.

Each input 102$a$-$n$ is associated with a routing engine 108$a$-$n$. Routing engines 108$a$-$n$ determine for all data traffic received by an input 102$a$-$n$ which output 104$a$-$n$ to send the data traffic. When implementing adaptive routing, each routing engine 108$a$-$n$ identifies one or more acceptable routes to send the data traffic based on the received congestion information from the outputs The congestion information may be received by the routing engines 108$a$-$n$ in congestion information messages sent by the outputs in various embodiments, while in other embodiments the congestion information may be received by the routing engine 108$a$-$n$ monitoring a common data bus for broadcasts of congestion information updates from the outputs. As a non-limiting example, out of the acceptable options, a routing engine, for example routing engine 108$c$, may identify the shortest data path to the next hop (which generally includes lower transmission latency). In various embodiments, routing engines 108$a$-$n$ may be one or more state machines configured to determine optimal routes based on state changes within the system. In various embodiments, routing engines 108$a$-$n$ may be separate engines located at or communicatively coupled to each input 102$a$-$n$. It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Unlike current routing engines (which are stateless), each routing engine 108$a$-$n$ may maintain knowledge of the amount of data traffic it has determined to send to each output and/or previous routing decisions, referred to herein as usage information. By implementing stateful routing engines (i.e., routing engines which have knowledge of the state of the network), embodiments of the present disclosure can improve upon the congestion information-only routing decision approach. In various embodiments, each routing engine 108$a$-$n$ may utilize a table, database structure, or other tracking approach to maintain the usage information. In various embodiments, each routing engine 108$a$-$n$ may track usage information through the use of one or more counters, timers, or a combination thereof. In some embodiments, each routing engine 108$a$-$n$ may be associated with a non-transitory storage media for maintaining instructions for performing routing decisions and tracking usage information relevant for each input 102$a$-$n$, the non-transitory storage media being dedicated to each routing engine 108$a$-$n$ in some embodiments or a common non-transitory storage media in other embodiments. As a non-limiting example, memory 130 may store the usage information.

In various embodiments, each routing engine 108$a$-$n$ may have knowledge of only the data traffic the respective routing engine 108$a$-$n$ has sent to each output 104$a$-$n$. In other words, each routing engine 108$a$-$n$ may not have complete usage information for each output 104$a$-$n$, lacking knowledge of data traffic sent to each output 104$a$-$n$ from other routing engines 108$a$-$n$. In some embodiments, each routing engine 108$a$-$n$ may have knowledge of data traffic sent to each output from not only itself, but from one or more other routing engines 108$a$-$n$. In such embodiments, the routing engine 108$a$-$n$ may have more accurate usage information for each port. In other embodiments, routing engines 108a-n may be combined into a single routing engine 108 (i.e., a global routing engine) communicatively coupled to each of the inputs 102a-n. In such embodiments, global routing engine 108 may maintain knowledge of all data traffic sent from each input 102a-n to each output 104a-n, having usage information for each output 104a-n from all inputs 102a-n.

In some embodiments, each input 102a-n may track the usage information for each output 104a-n to which it has sent data traffic. Although maintained by the input 102a-n, this usage information may still be considered "known" to the associated routing engine 108a-n, as the routing engine 108a-n is tasked with making routing decisions. In various embodiments, a routing engine 108a-n may be incorporated into each input 102a-n as a single component.

In various embodiments, each routing engine 108a-n and/or input 102a-n may receive congestion information updates from the outputs 104a-n at different times. As stated above, because the congestion information is not instantaneously received from the outputs 104a-n, receipt of the information on the input-side may be staggered as the congestion information traverses the system, such as (but not limited to) over a ring bus. Accordingly, each routing engine 108a-n and/or input 102a-n may have a different understanding of the congestion at each output 104a-n at the same time.

Routing engines 108a-n may be implemented in hardware, such as a main processor 120 or a co-processor, in software or firmware, such as instructions stored on a non-transitory machine-readable storage media, or a combination thereof. In some embodiments, the routing engines 108a-n may be implementing in one or more switching processors. Switching processors may be one component or distinct components in various embodiments, and may be combined with the main processor 120 in other embodiments. In some embodiments, routing engines 108a-n may be implemented as or within a virtual machine. Although not shown, in some embodiments each output 104a-n may also be connected to a routing engine, which in some embodiments may be the same as routing engines 108a-n. In other embodiments, routing engines associated with the outputs 104a-n may be distinct from routing engines 108a-n.

Although described with respect to router 100 of FIG. 1, as will be understood by a person of ordinary skill in the art, the technology disclosed herein is applicable to any router or other switching device where these is non-instantaneous receipt of congestion information from outputs. That is, the specific architecture of the switching device does not limit the scope of the subject matter of the present disclosure. As non-limiting examples, embodiments discussed herein may be implemented in monolithic architectures, multi-crossbar architectures, application specific integrated circuits (ASICs) designed to serve as a switching device, among others.

Because each routing engine 108a-n traditionally makes routing decisions based on the received congestion information until updated information is received, the decision may be suboptimal due to an unidentified change in the congestion status at the outputs 104a-n. To enable more intelligent routing decisions, embodiments of the present disclosure leverage the usage information known to each routing engine discussed above to make educated predictions as to how the congestion state may have changed in between receiving congestion updates from each output, unlike current solutions.

Figure 2:
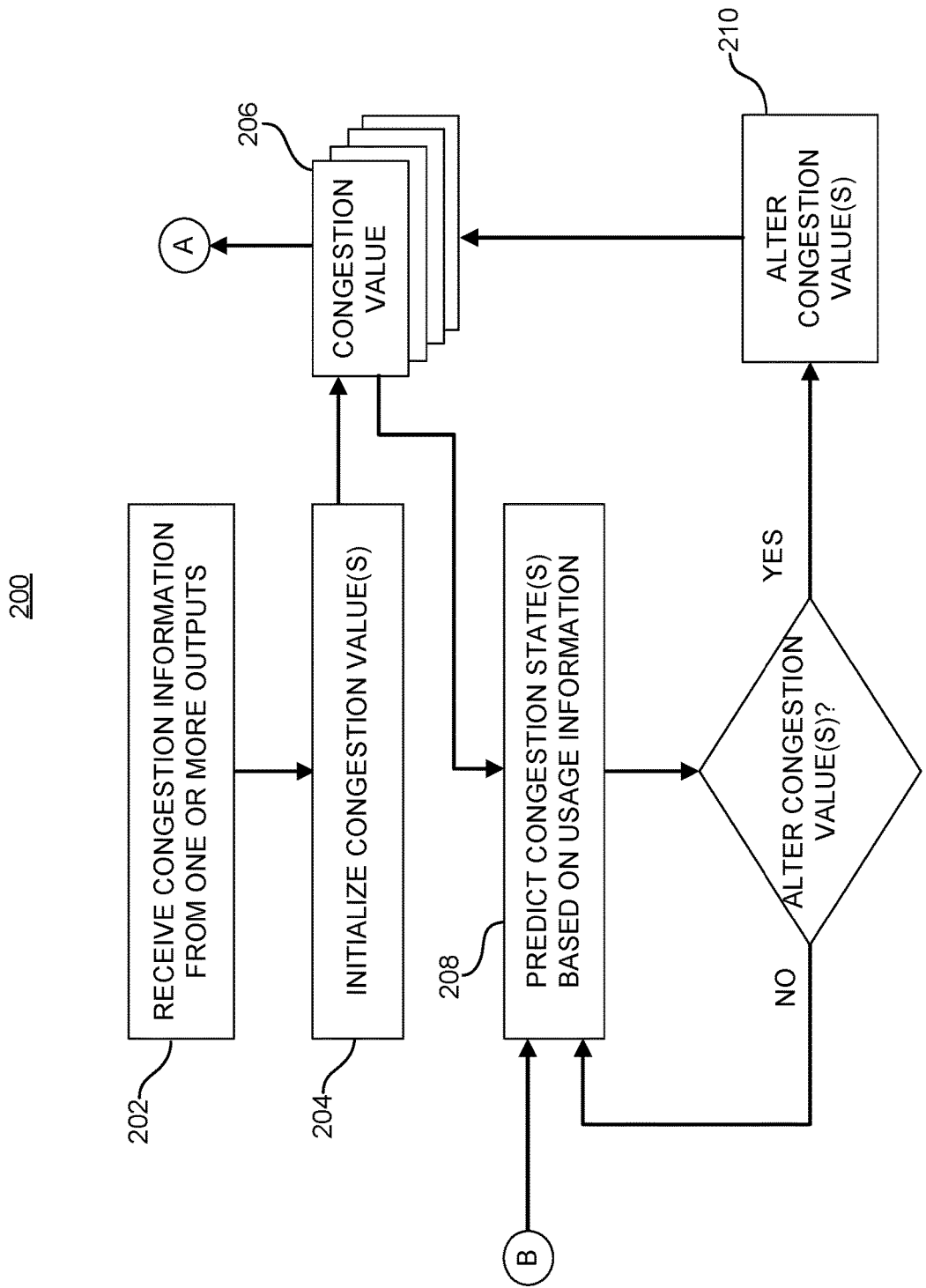
FIG. 2 is an example congestion state prediction process in accordance with embodiments of the technology disclosed herein.

FIG. 2 illustrates an example congestion state prediction process 200 in accordance with embodiments of the present disclosure. Congestion state prediction process 200 is provided as an example only and should not be interpreted to limit the scope of the technology to only the illustrated process 200. Moreover, in some embodiments, congestion state prediction process 200 may include additional operations than those illustrated in FIG. 2. Although discussed with respect to congestion state prediction process 200 being executed by a routing engine, a person of ordinary skill in the art would understand that the example congestion state prediction process 200 may be performed by any processing entity within a switching device tasked with making routing decisions. The example congestion state prediction process 200 may be performed by within a switching device, such as router 100 of FIG. 1.

Referring to FIG. 2, the routing engine may receive congestion information from one or more outputs at operation 202. As discussed above, each output may broadcast information regarding congestion at each output. In various embodiments, the congestion information may comprise one or more values indicative of the congestion situation at each output. In some embodiments, the congestion information may comprise one or more of a congestion state value, a congestion percentage, an amount of queued data traffic blocks awaiting egress, and/or a indicator of a particular state (e.g., "half-full," "near saturation," "available for more data traffic," etc.). In various embodiments, the congestion information may be a number of packets or flits enqueued at each output. Congestion may be determined based on the number of packets waiting to be egressed from the output, with a greater number of packets indicates that the data path from the output is sluggish or congested. In other embodiments, the congestion information may be an integer representative of a percentage of the capacity of each output. As a non-limiting example, the integer "5" may be sent to indicate that the output is at 50% capacity, while integer "7" may indicate 70% capacity. The congestion information may be received by the routing engine(s), or received by the inputs and known to the routing engine(s). As discussed above, the routing engine(s) and/or inputs may be on a shared data bus with the outputs, such as (but not limited to) a ring bus.

At operation 204, after receiving the congestion information from the one or more outputs, the routing engine may initialize one or more congestion values (206). Initialization may comprise setting a congestion value associated with each output based on the congestion information received from the respective output. In various embodiments, a congestion value may be associated with each output, while in other embodiments a congestion value may be associated with more than one output, the congestion value being based on the congestion information from each associated output. In some embodiments, the congestion information may be interpreted from a non-numerical value (e.g., "half-full" messages discussed above) into a numerical value which may be used in making the routing decision. In other embodiments, initializing the congestion values may comprise setting a register or other data structure (real or logical) indicating a particular congestion value (e.g., a set of registers, each indicating a value from "1" to "10"). In various embodiments, more than one congestion value may be associated with each output. As a non-limiting example, the routing engine may initialize a congestion value for each priority class assigned to data traffic routed to the output. Setting the congestion value(s) may comprise the routing engine treating the received congestion information as true, thereby making routing decisions under the assumption that the congestion information received is valid. The routing engine may utilize the congestion value(s) to make routing decisions (through reference A).

As discussed above, the routing engine may make routing decisions under the assumption that the received congestion information (i.e., the initialized congestion value(s)) is valid until updated congestion information is received. To account for routing decisions not embodied within the received congestion information, the routing engine may predict congestion state(s) for the one or more outputs based on usage information at operation 208. Based on the usage information known to the routing engine (as discussed above with respect to FIG. 1), embodiments in accordance with the present disclosure may predict whether the congestion value(s) need be altered to reflect anticipated changes in congestion not captured by the previously received from the outputs. Usage information may be continually updated by the routing engine (through reference B) to include new information known to the routing engine since the last time operation 208 was executed (e.g., the updated usage information from, as a non-limiting example, the example routing decision processes 300A and 300B discussed below with respect to FIGS. 3A and 3B). Usage information may include, but is not limited to, one or more counters, one or more timers, or a combination thereof.

If the routing engine determines, based on the prediction at operation 208, that one or more congestion values need to change ("YES" branch), the routing engine may alter the congestion value(s) at operation 210. In various embodiments, the routing engine may determine a change in the congestion value(s) is necessary by predicting a potential change in the congestion situation at the output(s) based on a forwarding threshold, a duration threshold, or a combination thereof.

As a non-limiting example, the routing engine may reset a counter(s) after receiving the congestion information, either at operation 202 or operation 204. The counter(s) may track the number of data blocks sent by the routing engine to one or more outputs. In various embodiments, the routing engine may determine that one or more congestion values need to be increased because the counter(s) in the usage information shows that the routing engine has forwarded a number of blocks of data traffic to an output exceeding a forwarding threshold. In such cases, the routing engine may predict that the congestion situation as gotten worse at the output because of the number of data blocks sent to the output since the last congestion information was received. At operation 210, the routing engine can increase a congestion value(s) associated with the output to reflect this change, reducing the probability that the routing engine would select to send additional packets to that output. After altering the congestion value(s), the routing may reset the counter(s) at operation 210 in some embodiments. By resetting the counter(s), the routing engine may utilize the same forwarding threshold to determine whether additional alterations need occur prior to receiving new congestion information from the output(s) at operation 202.

As another non-limiting example, in some embodiments the routing engine may start a timer(s) after receiving the congestion information, either at operation 202 or operation 204. The timer(s) may track the time in between when the routing engine sends data blocks to the output(s). The usage information (as updated from reference B) may include the current state of the timer, as discussed below with respect to FIGS. 3A and B below. In various embodiments, if the routing engine determines that the timer exceeds a designated period, the routing engine may determine that the congestion situation at the output(s) may have improved because the routing engine is not aware of any data blocks being sent to the output(s) in that period. As such, the routing engine may alter the congestion value(s) at operation 210 to decrease the congestion value(s) associated with the output, indicating to the routing engine that the output is a good candidate to which to send data traffic. After altering the congestion value(s), the routing may reset the timer(s) at operation 210 in some embodiments. By resetting the timer(s), the routing engine may utilize the same duration threshold to determine whether additional alterations need occur prior to receiving new congestion information from the output(s) at operation 202.

In various embodiments, the extent to which the congestion value(s) is altered at operation 210 may be predetermined, whereas in other embodiments the extent of alteration may be based on the congestion value(s) set at the time of the prediction at operation 208. By enabling the routing engine to determine the extent of alteration on the fly, such embodiments of the technology disclosed herein may more accurately reflect the impact of predicted congestion states at a given time in between receiving congestion information updates. As a non-limiting example, the impact of forwarding n data blocks to an output with a congestion value indicating the output is at 20% capacity may be less than the impact of forwarding the same number of data blocks to an output with a congestion value indicating the output is at 75% capacity.

In implementations comprising a global routing engine, the usage information may comprise usage information regarding data traffic sent from all inputs to the output port(s). In this way, whether to update one or more congestion values for a given output may be determined based on a fully understanding of the status of data traffic sent to the output since the last congestion information update, enabling a more informed prediction.

Upon receiving a subsequent update of congestion information from one or more outputs, the routing engine may restart example congestion state prediction process 200 at operation 202, reinitializing the congestion value(s) such that the routing engine will treat the newly received congestion information as true. The routing engine may then make predictions regarding congestion until the next congestion information update is received.

Figure 3A:
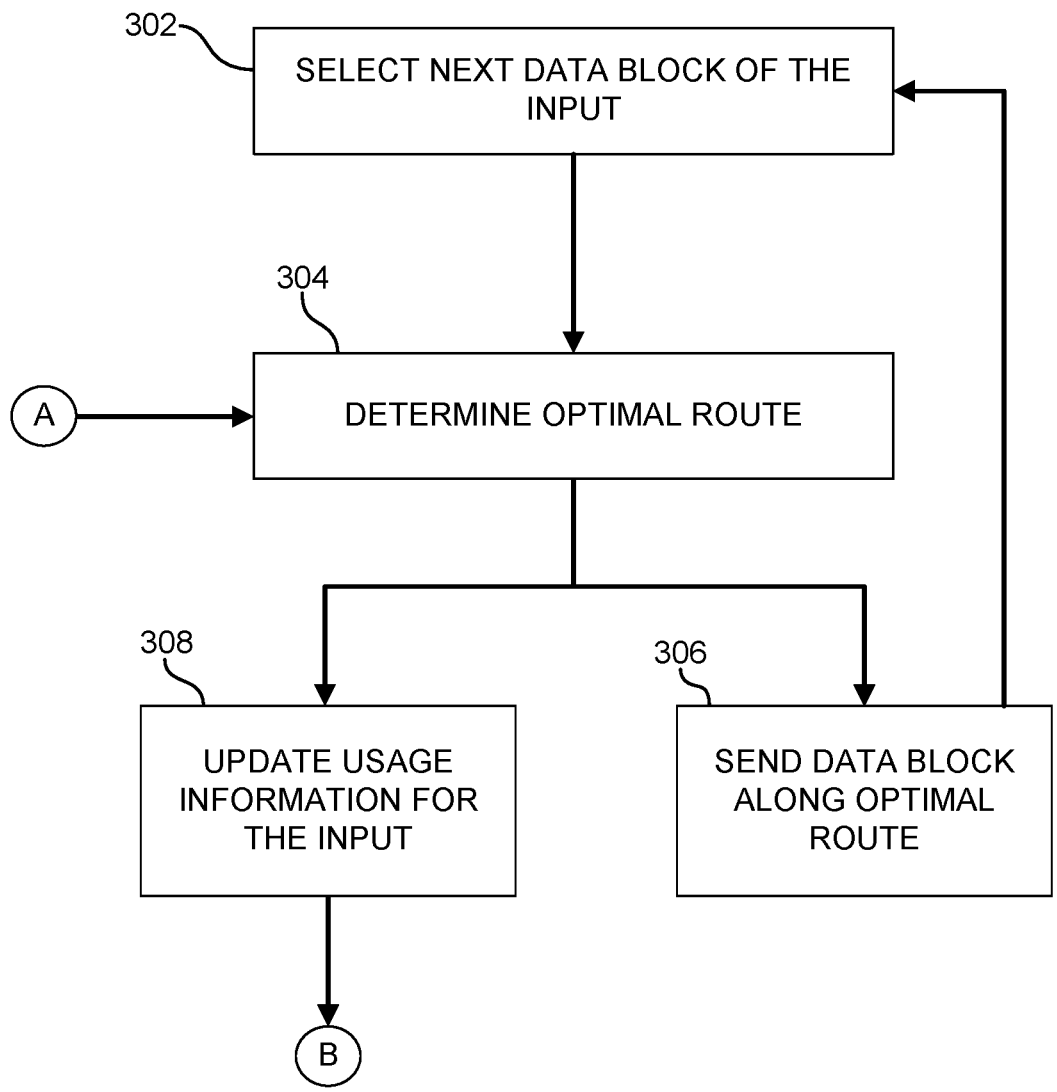
FIG. 3A is an example routing decision process in accordance with embodiments of the technology disclosed herein.

FIG. 3A illustrates an example routing decision process 300A in accordance with embodiments of the technology discussed herein. In various embodiments, routing decision process 300 may be performed in parallel with example congestion state prediction process 200 discussed with respect to FIG. 2. For ease of discussion, routing decision process 300 is discussed from the perspective of a single input of a switching component (e.g., switching component 110). At operation 302, a routing engine selects the next data block of the input. In various embodiments, the routing engine may make a routing decision for each data block at the input when preparing to route the data block. At operation 304, the routing engine may determine an optimal route. In various embodiments, the optimal route may be determined in view of the set congestion value(s) (as illustrated by reference A common between FIGS. 2 and 3A). The routing decision may be performed according to known adaptive routing algorithms modified to consider the set congestion value(s), enabling the routing decision to account for predicted changes in the congestion state at the output(s). After determining the optimal route for the selected data block, the routing engine may send the data block along the optimal route at operation 306. After sending the data block at operation 306, the routing engine may return to operation 302 and select the next block, restarting the route decision process 300A. In addition to sending the data block at operation 306, routing engine may update usage information for the selected output at operation 308. The routing engine may update the usage information after each data block is sent in various embodiments. The updated usage information may be used at operation 208 (as illustrated by reference B common between FIGS. 2 and 3A) to apply the usage information to the congestion value(s) in predicting the need to alter the value(s).

Figure 3B:
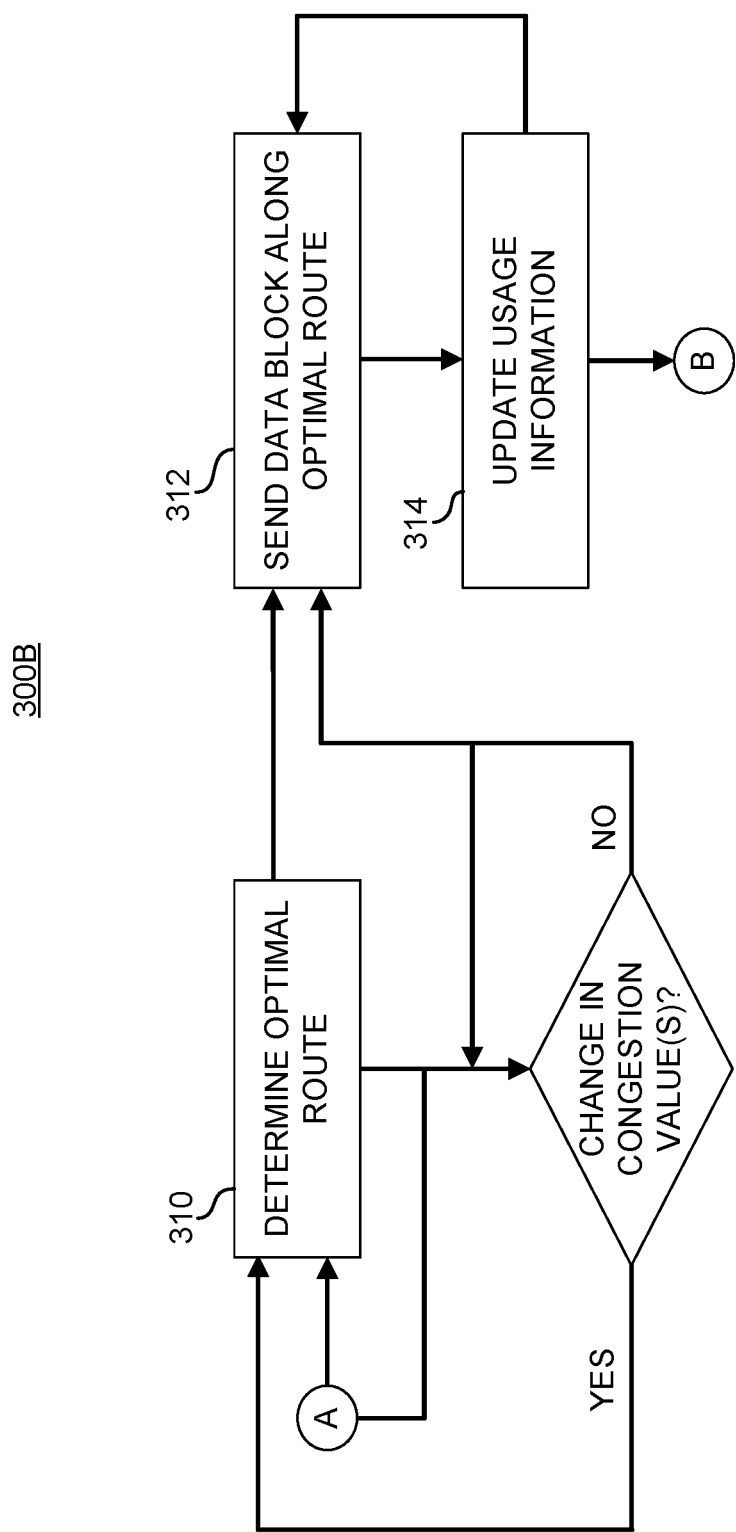
FIG. 3B is another example routing decision process in accordance with embodiments of the technology disclosed herein.

In various embodiments, the routing engine may only make a routing decision if the congestion value(s) change, such as the result of example congestion state prediction process 200 discussed with respect to FIG. 2. FIG. 3B illustrates another example routing decision process 300B in accordance with embodiments of the technology disclosed herein. Similar to the example routing decision process 300A of FIG. 3A, example routing decision process 300B is discussed from the perspective of a single input of a switching component (e.g., switching component 110). At operation 310, the routing engine may determine an optimal route based on the congestion value(s) (from common reference A between FIGS. 2 and 3B). Operation 310 may be performed in a manner similar to operation 304 discussed above with respect to FIG. 3A. In various embodiments, the routing engine may reset one or more counters, timers, or a combination of both. After making the determination, the routing engine may send a data block along the optimal route at operation 312, which may be performed in a manner similar to operation 306 discussed with respect to FIG. 3A. In various embodiments, after sending a data block, the routing engine may update the usage information at operation 314, in a manner similar to that discussed above with respect to operation 308 of FIG. 3A.

In parallel to sending data blocks, the routing engine may continue to check whether a change has occurred in the congestion value(s). The routing engine can continue to check the congestion value(s) (as indicated by the line from reference A to the decision block) to identify if a change occurs, which may necessitate a change in the optimal route determination. If the routing engine determines that the congestion value(s) has not changed ("NO" branch), the routing engine may continue to send data blocks at operation 312, and return to consider if the congestion value(s) has changed. If the routing engine does determine that the congestion value(s) has changed ("YES" branch), the routing engine may return to operation 310 to reassess the optimal route determination, in view of the altered congestion value(s) set by the routing engine according to a prediction algorithm, such as congestion state prediction process 200 discussed with respect to FIG. 2.

Figure 4:
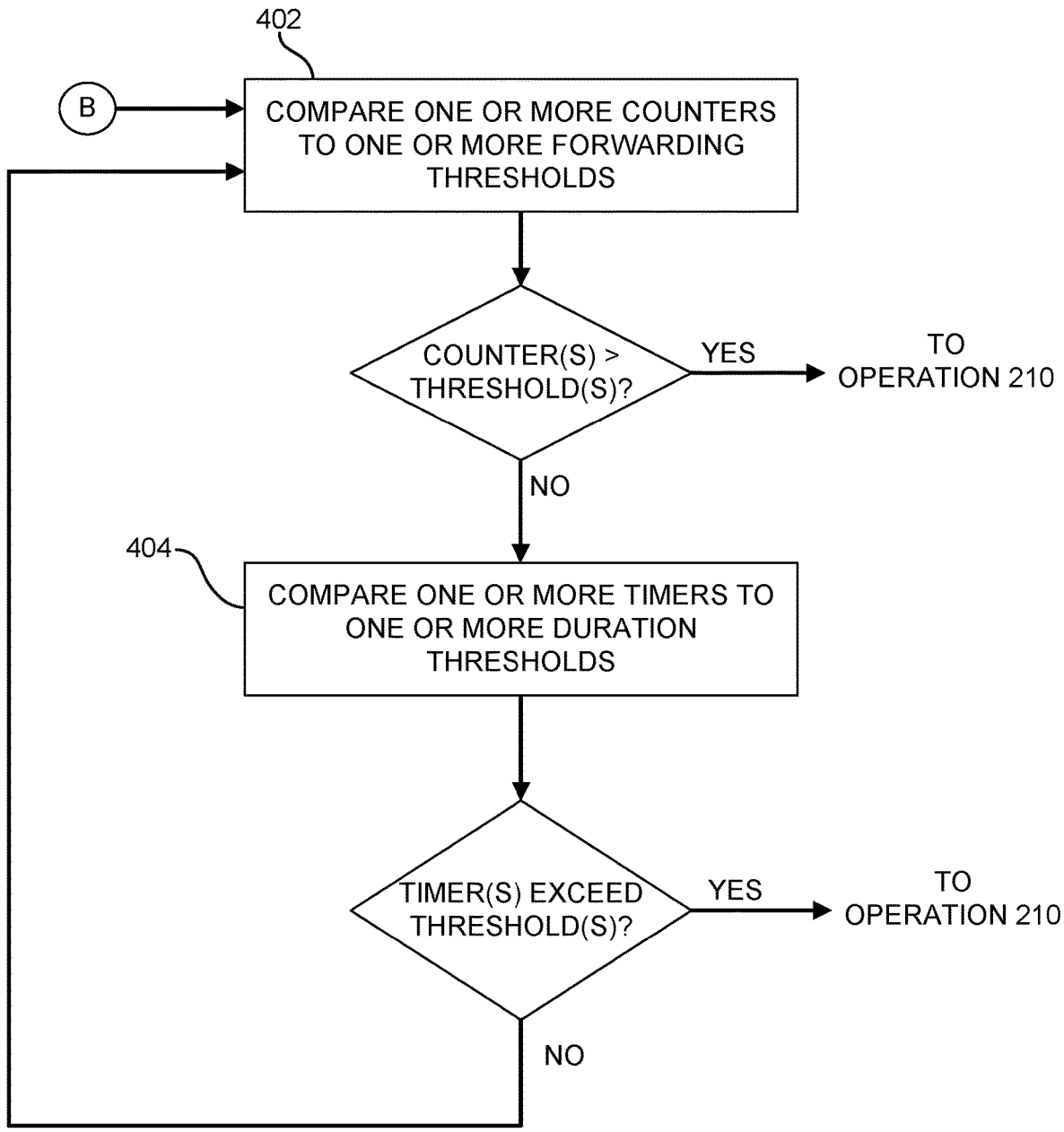
FIG. 4 is an example prediction process in accordance with embodiments of the technology disclosed herein.

FIG. 4 illustrates an example prediction process 400 in accordance with embodiments of the technology disclosed herein. Example prediction process 400 may be performed at operation 208 discussed with respect to FIG. 2. Example prediction process 400 is provided for illustrative purposes only and should not be interpreted as limiting the prediction algorithm used in embodiments of the present disclosure. In various embodiments, greater or fewer operations may be performed to predict the congestion state(s) at one or more outputs. As illustrated in FIG. 4, prediction process 400 may compare one or more counters to one or more forwarding thresholds at operation 402. As discussed above, forwarding thresholds may be used to determine whether to increase the congestion value(s) due to the routing engine having sent a number of data blocks to each output exceeding the forwarding thresholds. In various embodiments, the routing engine may maintain a forwarding threshold for each output, while in other embodiments each output may be associated with more than one forwarding threshold. As a non-limiting example, the routing engine may associated a different forwarding threshold for each priority class of data blocks sent to an output. In various embodiments, the one or more forwarding thresholds may be the same for each output, whereas in other embodiments the routing engine my set the forwarding threshold(s) for each output based on the congestion state indicated by the congestion value(s) for that output. By basing the forwarding threshold on the congestion value(s), the routing engine may dynamically determine the forwarding thresholds, identifying the need to alter the congestion value(s) in a more granular manner.

If the routing engine determines that at least one of the counters exceeds an associated forwarding threshold ("YES" branch), the routing engine may determine that the congestion value(s) need be altered. After making this determination, the routing engine may proceed to alter the congestion value(s), such as proceeding to operation 210 discussed with respect to FIG. 2. As discussed above, duration thresholds may be used to determine whether to decrease the congestion value(s) due to the routing engine knowing that it had not sent data blocks to the output within a certain period. In various embodiments, the routing engine may apply the same duration threshold to each output, whereas in other embodiments the routing engine may maintain different duration thresholds for one or more outputs. In some embodiments, the routing engine may determine the duration thresholds based on the congestion value(s), similar to the dynamic determination discussed with respect to the forwarding thresholds, facilitating more granular prediction control.

If the routing engine determines that none of the one or more counters do exceed one or more associated forwarding thresholds ("NO" branch), the routing engine may proceed to comparing one or more timers to one or more duration thresholds at operation 404. As discussed above, duration thresholds may be used to determine whether to decrease the congestion value(s) due to the routing engine knowing that it had not sent data blocks to the output within a certain period. In various embodiments, the routing engine may apply the same duration threshold to each output, whereas in other embodiments the routing engine may maintain different duration thresholds for one or more outputs. In some embodiments, the routing engine may determine the duration thresholds based on the congestion value(s), similar to the dynamic determination discussed with respect to the forwarding thresholds, facilitating more granular prediction control. The one or more timers may be associated to outputs similar to the way in which the one or more counters are associated to outputs as discussed above. If one or more timers exceed an associated duration threshold ("YES" branch), the routing engine may proceed to operation 210, similarly to the "YES" branch discussed with respect to the counter(s). If none of the timers exceed any associated duration thresholds ("NO" branch), the routing engine may return to operation 402 to restart the prediction process, based on the updated usage information (indicated by reference B).

Implementing embodiments of the technology discussed herein provide for a faster acting adaptive routing approach accounting for intermediate changes in congestion states between broadcasts of congestion information from the outputs. As the latency for propagating congestion information from the outputs to the inputs increases, the impact on stale congestion information increases exponentially. By predicting changes in congestion, embodiments in accordance with embodiments of the present disclosure can account for information regarding traffic sent to the outputs that is unaccounted for in the stale congestion information.

Figure 5:
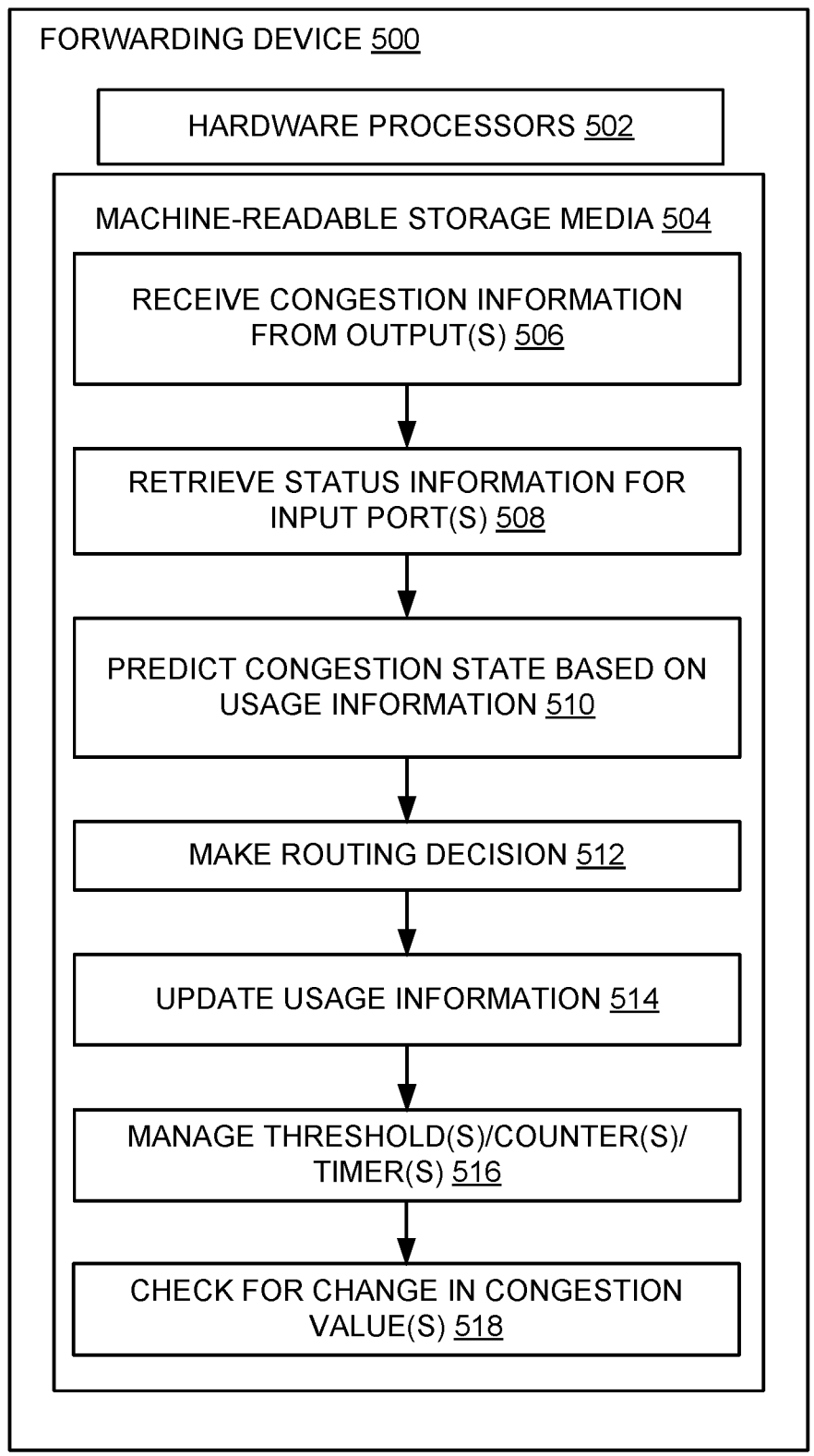
FIG. 5 is an example forwarding device in accordance with embodiments of the technology disclosed herein.

FIG. 5 is an example forwarding device 500 in accordance with embodiments of the present disclosure. Where operations and functionality of forwarding device 500 are similar to those discussed with respect to FIGS. 1, 2, 3A, 3B, and 4, the description should be interpreted to apply. In various embodiments, the forwarding device 500 may be a router, switch, hub, gateway, or other data forwarding device implementing adaptive routing. Forwarding device 500 includes hardware processors 502. In various embodiments, hardware processors 502 may be similar to the processors discussed above with respect to FIG. 1. In various embodiments, hardware processors 502 may include one or more processors.

Hardware processors 502 are configured to execute instructions stored on a machine-readable medium 504. Machine readable medium 504 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 504 may include various sub-instructions for performing the function embodied by the identified functions. For example, the instruction "receive congestion information from output(s)" may include various sub-instructions for receiving, by a routing engine, congestion information from one or more output in a manner discussed with respect to FIGS. 1, 2, 3A, 3B, and 4 above. In various embodiments, a separate hardware processor 502 of the one or more hardware processors 502 may comprise the routing engine for an input and configured to execute instruction 506, while in other embodiments a common hardware processor 502 may serve as a global routing engine, executing instruction 506 for all inputs.

The instruction "set congestion value(s) based on received congestion information" 508 may include sub-instructions for the routing engine to interpret the received congestion information and set the congestion value(s) to correspond to the received congestion information, in a manner similar to that discussed with respect to FIGS. 1, 2, 3A, 3B, and 4 above.

The instruction "predict congestion state based on usage information" 410 may include sub-instructions for predicting whether the congestion value(s) need alteration based on usage information, in a manner similar to the discussed above with respect to FIGS. 1, 2, 3A, 3B, and 4. In some embodiments, the instruction 510 may include sub-instructions for comparing one or more counters to one or more forward thresholds and/or comparing one or more timers to one or more duration thresholds, similar to the methods discussed above with respect to FIGS. 1, 2, 3A, 3B, and 4.

The instruction "make routing decision" 512 may include sub-instructions for the routing engine to make an optimal routing decision, such as the routing decisions discussed above with respect to FIGS. 1, 2, 3A, 3B, and 4. As stated above, the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The instruction "update usage information" 514 may include sub-instructions for the routing engine to update one or more counters and/or timers based on routing decision made, similar to the checks discussed with respect to FIGS. 1, 2, 3A, 3B, and 4. The instruction "manage threshold(s)/counter(s)/timer(s)" 516 may include sub-instructions for setting and/or changing one or more thresholds, counters, and/or timers used in the system, such as those discussed with respect to FIGS. 1, 2, 3A, 3B, and 4. The instruction "check for change in congestion value(s)" 518 may comprise sub-instructions causing the routing engine to check to identify if the congestion value(s) have changed, similar to the manner discussed with respect to FIGS. 1, 2, 3A, 3B, and 4.

Figure 6:
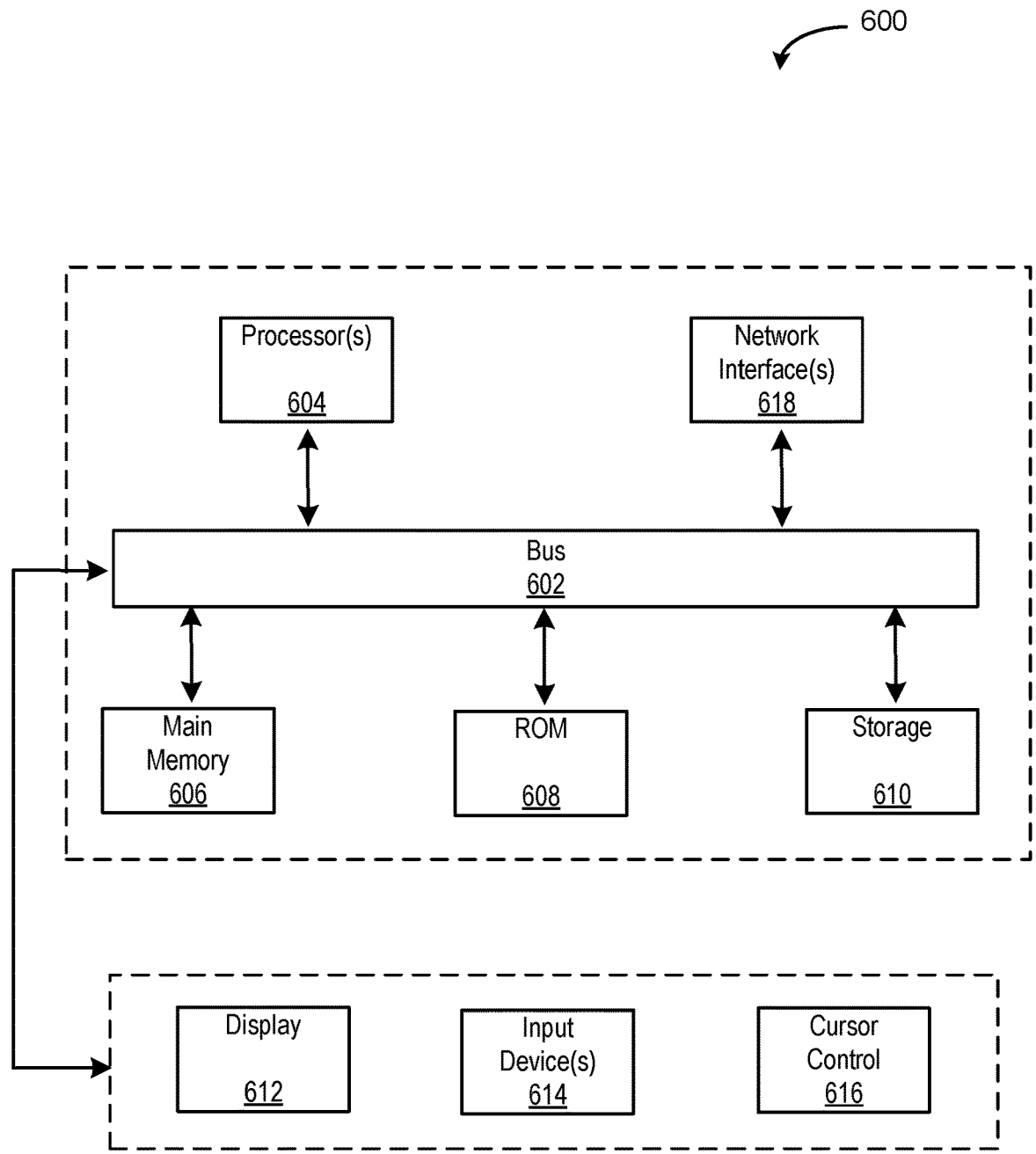
FIG. 6 is an example computing system in which embodiments described in the present disclosure may be implemented.

FIG. 6 depicts a block diagram of an example computer system 6500 in which various of the embodiments described herein may be implemented. The computer system 600 includes a bus 602 or other communication mechanism for communicating information, one or more hardware processors 604 coupled with bus 6502 for processing information. Hardware processor(s) 604 may be, for example, one or more general purpose microprocessors. In various embodiments, the one or more hardware processors 604 may execute non-transitory machine-readable instructions to perform the various functions of the embodiments discussed with respect to FIGS. 1, 2, 3A, 3B, and 4.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may further include a display 612, input device 514, and/or a cursor control 616 coupled to bus 602 for displaying, communicating, and entering information and/or commands. In some embodiments, the same direction information and command selections as cursor control may be implemented via receiving touches on a touch screen without a cursor. The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. In various embodiments, such instructions may be similar to those discussed with respect to FIG. 5. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602 for enabling two way communication with one or more networks over one or more network links. For example, communication interface 618 may be an integrated services digital network (ISDN) card, cable modem, satellite modem, a modem to provide a data communication connection to a corresponding type of telephone line, a local area network (LAN), a wide area network, or one or more types of wireless communication links.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   receiving, by a routing engine associated with a first input of a router, congestion information from an output;
   initializing, by the routing engine, a first congestion value based on the received congestion information from the output and associated with the first input of the router; and
   until a second congestion state value is determined from a second input of the router, continuously predicting, by the routing engine, a change in a congestion state of the output based on the first congestion value and usage information for the output known to the routing engine.

2. The method of claim 1, comprising, in response to predicting no change in the congestion state:
   updating, by the routing engine, the usage information for the output, the updated usage information indicating that the usage information is known to the routing engine since a previous prediction occurred; and
   predicting, by the routing engine, a change in the congestion state of the output based on the first congestion value and the updated usage information for the output.

3. The method of claim 2, comprising:
   determining, by the routing engine, an optimal route based on the first congestion value.

4. The method of claim 1, comprising, in response to predicting a change in the congestion state:
   altering, by the routing engine, the first congestion value to generate an altered congestion value;
   updating, by the routing engine, the usage information for the output, the updated usage information indicating that the usage information is known to the routing engine since a previous prediction occurred; and
   predicting, by the routing engine, a change in the congestion state of the output based on the altered congestion value and the updated usage information.

5. The method of claim 1, wherein predicting a change in the congestion state of the output comprises:
   comparing, by the routing engine, a counter to a forwarding threshold, the counter identifying an amount of data blocks known to the routing engine to have been sent to the output, and the forwarding threshold comprising a total amount of data blocks indicating a change in the congestion state;
   determining, based on the comparison, if the counter exceeds the forwarding threshold; and
   in response to determining the counter exceeds the forwarding threshold, altering, by the routing engine, the first congestion value to generate an altered congestion value.

6. The method of claim 5, comprising, in response to determining the counter exceeds the forwarding threshold, resetting, by the routing engine, the counter.

7. The method of claim 5, comprising, in response to determining the counter exceeds the forwarding threshold, determining, by the routing engine, an optimal route based on the altered congestion value.

8. The method of claim 5, comprising, in response to determining the counter does not exceed the forward threshold:
   comparing, by the routing engine, a timer to a duration threshold, the timer identifying an amount of time since a data block is known to the routing engine to have been sent to the output, and the duration threshold comprising a total time between sending of data blocks indicating a change in the congestion state;
   determining, based on the comparison, if the timer exceeds the duration threshold; and
   in response to determining the timer exceeds the duration threshold, altering, by the routing engine, the first congestion value to generate an altered congestion value.

9. The method of claim 8, comprising, in response to determining the timer exceeds the duration threshold, resetting the timer.

10. The method of claim 8, comprising, in response to determining the timer exceeds the duration threshold, determining, by the routing engine, an optimal route based on the altered congestion value.

11. The method of claim 8, comprising, in response to determining the timer does not exceed the duration threshold:
    updating, by the routing engine, the usage information for the output, the updated usage information indicating that the usage information is known to the routing engine since a previous prediction occurred; and
    predicting, by the routing engine, a change in the congestion state of the output based on the first congestion value and the updated usage information.

12. The method of claim 1, wherein predicting a change in the congestion state of the output comprises:
    comparing, by the routing engine, a timer to a duration threshold, the timer identifying an amount of time since a data block is known to the routing engine to have been sent to the output, and the duration threshold comprising a total time between sending of data blocks indicating a change in the congestion state;
    determining, based on the comparison, if the timer exceeds the duration threshold; and
    in response to determining the timer exceeds the duration threshold, altering, by the routing engine, the first congestion value to generate an altered congestion value.

13. The method of claim 12, comprising, in response to determining the timer exceeds the duration threshold, resetting the timer.

14. The method of claim 12, comprising, in response to determining the timer does not exceed the duration threshold:
    updating, by the routing engine, the usage information for the output, the updated usage information indicating that the usage information is known to the routing engine since a previous prediction occurred; and predicting, by the routing engine, a change in the congestion state of the output based on the first congestion value and the updated usage information.

15. The method of claim 1, wherein the router comprises a plurality of inputs, and the routing engine comprises a global routing engine associated with the plurality of inputs and configured to make routing decisions for each of the plurality of inputs.

16. A switching component, comprising:
a first input and a second input;
an output;
a routing engine associated with the first input and configured to make routing decisions for the first input, and configured to receive congestion information messages from the output;
the routing engine configured to predict a change in a congestion state of the output in between reception of each congestion information message, predicting a change in the congestion state comprising:
  receiving a congestion information message from the output;
  initializing a first congestion value based on the received congestion information message from the output; and
  predicting a change in a congestion state of the output based on the first congestion value and usage information for the output known to the routing engine.

17. The switching component of claim 16, wherein the routing engine comprises hard-wired circuitry configured to perform the prediction.

18. The switching component of claim 16, predicting a change in the congestion state of the output comprising, in response to predicting no change in the congestion state:
  updating the usage information for the output, the updated usage information indicating that the usage information is known to the routing engine since a previous prediction occurred; and
  predicting, by the routing engine, a change in the congestion state of the output based on the first congestion value and the updated usage information for the output.

19. The switching component of claim 16, comprising a plurality of inputs, a plurality of outputs, and the routing engine comprises a global routing engine associated with all of the plurality of inputs and configured to make routing decisions for each of the plurality of inputs based on a plurality of congestion information messages received from each of the plurality of outputs.

20. A non-transitory machine-readable storage medium storing instructions which, when executed by a processor, cause the processor to:
  receive, by a routing engine associated with a first input of a router, congestion information from an output;
  initialize, by the routing engine, a first congestion value based on the received congestion information from the output and associated with the first input of the router;
  until a second congestion state value is determined from a second input of the router, continuously predict, by the routing engine, a change in a congestion state of the output based on the first congestion value and usage information for the output known to the routing engine;
  in response to predicting no change in the congestion state:
    update, by the routing engine, the usage information for the output, the updated usage information indicating that the usage information is known to the routing engine since a previous prediction occurred; and
    predict, by the routing engine, a change in the congestion state of the output based on the first congestion value and the updated usage information for the output; and
  in response to predicting a change in the congestion state:
    altering, by the routing engine, the first congestion value to generate an altered congestion value;
    updating, by the routing engine, the usage information for the output, the updated usage information indicating that the usage information is known to the routing engine since a previous prediction occurred; and
    predicting, by the routing engine, a change in the congestion state of the output based on the altered congestion value and the updated usage information.

* * * * *